Sept. 8, 1964          P. RAWCLIFFE, JR          3,147,646
                       SPECIAL PURPOSE DRILL
                        Filed Oct. 19, 1961
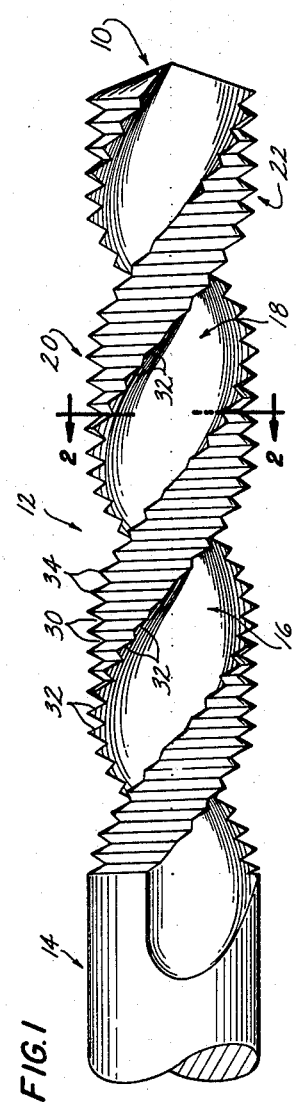
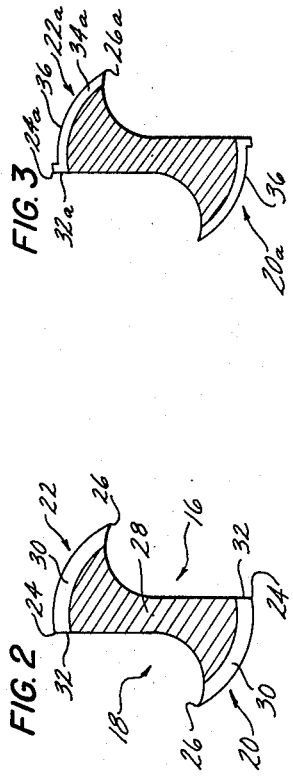
INVENTOR.
PERCY RAWCLIFFE, Jr.
BY
ATTORNEYS

United States Patent Office 3,147,646
Patented Sept. 8, 1964

3,147,646
SPECIAL PURPOSE DRILL
Percy Rawcliffe, Jr., New Bedford, Mass., assignor to Universal American Corporation, Wilmington, Del., a corporation of Delaware
Filed Oct. 19, 1961, Ser. No. 146,298
3 Claims. (Cl. 77—65)

This invention relates to a drill particularly adapted for use in the formation of holes in acoustical ceiling tile but which is usable with a wide variety of other soft, resilient, and/or fibrous materials, metallic and nonmetallic.

It is the general object of the invention to provide a drill of the type mentioned wherein small cutting edges are provided along the leading edge or edges of its land or lands, the drill thus being rendered capable of providing cleaner and more accurate holes than have heretofore been obtainable in materials of the type mentioned.

Conventional acoustical tile is formed of fibrous material with a multitude of small holes provided in its face for sound attenuation. Such holes must be clean and accurately formed in order to provide for good sound attenuation properties and attractive appearance of the tile. Conventional drills have not provided fully satisfactory results in these respects. As the drills are fed into the tile material there is a tendency for fibers to expand into the produced hole due to elastic recovery. Additionally, paint on the surface of the tile tends to draw into a reduced diameter and this also is believed to result from elastic recovery of the fibers underlying the paint. On withdrawal of the drill, severe flaking of the paint about the hole edges occurs and the hole is found to contain a substantial number of fibers and may even be substantially undersize. Poor sound attenuation and an unattractive appearance of the tile results.

Generally speaking, the drill of the present invention provides for a secondary cutting action effected by a plurality of small cutting edges disposed along the leading edge of its land or lands. As the drill enters the tile material, these cutting edges sever fibers as they tend to expand into the produced hole and they also cleanly sever surface paint as it tends to expand similarly into the hole. Further cutting action takes place during dwell and even during withdrawal of the drill to the end that a clean, accurately sized hole is provided with substantially no flaking of the paint adjacent the hole edges.

The drawing shows two embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawings:

FIG. 1 is a side elevational view of a drill embodying the present invention;

FIG. 2 is a radial cross section taken as indicated at 2—2 in FIG. 1 with background portions omitted; and FIG. 3 is a radial cross section similar to FIG. 2 but showing a drill forming a second embodiment of the invention.

Referring particularly to FIG. 1, it will be observed that a drill shown therein comprises a point section 10, a flute or land section 12, and a shank 14. The point section 10 may take any of a variety of well-known forms and the flute or land section 12 is also conventional in so far as it comprises first and second helical flutes 16 and 18 and first and second helical lands 20 and 22. The shank 14 may be conventional and is so shown.

As best shown in FIG. 2, each of the lands 20 and 22 has a leading edge 24 and a trailing edge 26. Drills embodying the invention may be either left hand or right hand, but a right-hand drill is shown with the leading and trailing edges 24 and 26 of the land 22 defined respectively by the flutes 18 and 16, and the leading and trailing edges 24 and 26 of the land 20 defined respectively by the flutes 16 and 18. A web 28 connecting the lands 20 and 22 may vary in form within the scope of the invention and land and flute configuration is similarly subject to wide variation.

In accordance with the invention, each of the lands 20 and 22 is provided with a series of grooves 30, 30 which grooves are spaced axially and extend substantially in radial planes. In all cases, the grooves 30, 30 on a land communicate at least with the flute defining the leading edge of the land whereby to define a series of small cutting edges 32, 32 along said edge. Preferably, and as shown, the grooves 30, 30 extend across each land 20 and 22 to the trailing edge thereof and communicate with the contiguous flute so as to serve as secondary or auxiliary flutes for the small cutting edges 32, 32. Also, in accordance with the presently preferred practice, the grooves 30, 30 are of uniform cross section throughout and they extend from leading edges of the lands at slight rearward angles with respect to radial planes. Specifically, and in the drill shown, the rearward inclination of the grooves 30, 30 and their shape and axial spacing is such that they serve to define a conventional screw thread having individual threads 34, 34.

The outer or maximum diameter of the threads or intergroove portions 34, 34 is shown as being uniform and substantially equal to the maximum diameter of the drill at its point section and such a construction is presently preferred. In all instances at least one thread or intergroove portion 34 has a maximum diameter at least equal to the maximum diameter of the drill at its said point section.

When the grooves 30, 30 provide screw threads 34, 34 on the lands 20 and 22 the method of manufacture may comprise first the formation of a conventional drill and thereafter, the formation of the screw threads by any conventional means. In use of the drill, the axial feed rate is established such that threads are not formed on the interior of the drilled hole, i.e., the feed rate is not equal to the helix of the thread per revolution. Thus, shearing action by the cutting edges 32, 32 is obtained and a clean, smooth-walled hole results. It is believed that an angular shearing action is obtained at the cutting edges 32, 32 during the feed portion of the drilling operation. During dwell, it is thought that straight or pure shearing action is obtained at the cutting edges 32, 32, and during withdrawal of the drill angular shearing action again occurs. Further, it is thought that the grooves 30, 30 serve as secondary or auxiliary flutes for the cutting edges 32, 32. That is, expanding fibers or other material severed by the cutting edges 32, 32 is believed to be directed through the grooves 30, 30 to and past the trailing edges of the lands and into the adjacent main flute.

The cross-sectional shape of the grooves 30, 30 may vary and when a screw thread is provided on the drill as presently preferred, the form of the threads 34, 34 may vary widely. Right and left-hand threads may be provided in accordance with the direction of rotation desired for the drill.

FIG. 3 shows a drill which is in all respects similar to the drill of FIGS. 1 and 2 except for the provision of "relief." Lands 20a and 22a have leading and trailing edges 24a and 26a and threads 34a, 34a are formed thereon to provide cutting edges 32a, 32a. However, each of the threads 34a, 34a has a reduced diameter relief portion 36 which is spaced from the leading edge 24a and which extends to the trailing edge 26a of the land. Relief portions of various configurations may be provided within the scope of the invention.

The invention claimed is:
1. A drill having a point section and an associated flute section extending rearwardly therefrom and comprising at least one helical land and at least one flute defining leading and trailing edges of the land, said land having an axially spaced series of grooves therein which extend from the leading edge of the land at rearward angles with respect to radial planes and which collectively form a screw thread, each of said grooves communicating with the flute at the leading and trailing edges of the land whereby said grooves collectively define a series of small cutting edges along said leading edge and serve as auxiliary flutes for said cutting edges and substantially all of the threads of said screw thread having a maximum diameter equal to the maximum diameter of the drill at its said point section.

2. A drill as set forth in claim 1 wherein said grooves are of uniform cross section between said leading and trailing edges of the land.

3. A drill as set forth in claim 1 wherein said screw threads each have a reduced diameter relief portion spaced from the leading edge of the land and extending to the trailing edge thereof.

References Cited in the file of this patent
UNITED STATES PATENTS 513,320 Hardsocg _____ Jan. 23, 1894

FOREIGN PATENTS 25,179 Great Britain _____ 1906
1,009,121 France _____ Feb. 27, 1952